United States Patent [19]

Bulat

[11] 4,223,232
[45] Sep. 16, 1980

[54] BATTERY CHARGING CIRCUIT FOR AN EMERGENCY SYSTEM

[75] Inventor: Bülent Bulat, New Haven, Conn.

[73] Assignee: Chloride Incorporated, North Haven, Conn.

[21] Appl. No.: 911,233

[22] Filed: May 31, 1978

[51] Int. Cl.² .............................................. H82J 7/10
[52] U.S. Cl. ......................................... 307/66; 320/9; 315/86; 340/333; 362/20
[58] Field of Search .................... 307/66; 320/DIG. 1, 320/9, 10; 315/86, 87, 119; 340/333; 362/20

[56] References Cited

U.S. PATENT DOCUMENTS

| | | | |
|---|---|---|---|
| 3,189,788 | 6/1965 | Cady | 307/66 |
| 3,255,398 | 6/1966 | Bagno | 307/66 |
| 3,278,823 | 10/1966 | Ross | 307/252 |
| 3,596,106 | 7/1971 | Raddi | 307/66 |
| 3,746,877 | 7/1973 | Seiter | 307/66 |
| 3,808,499 | 4/1974 | Edwards | 315/86 |
| 3,939,359 | 2/1976 | Nehushtan | 307/66 |
| 3,976,986 | 8/1976 | Zabroski | 340/253 C |
| 3,979,656 | 9/1976 | Takeda | 320/2 |

Primary Examiner—L. T. Hix
Assistant Examiner—S. D. Schreyer
Attorney, Agent, or Firm—Finnegan, Henderson, Farbow, Garrett & Dunner

[57] ABSTRACT

A single active element performs the multiple functions of regulating DC voltage level from an AC source supplied to charge a battery and of coupling the battery to power an emergency system such as an emergency lighting system upon loss of the AC source. Preferably, the single active element also performs a third function of disconnecting the battery from the emergency system in time to prevent over discharge and consequent permanent damage to the battery.

10 Claims, 1 Drawing Figure

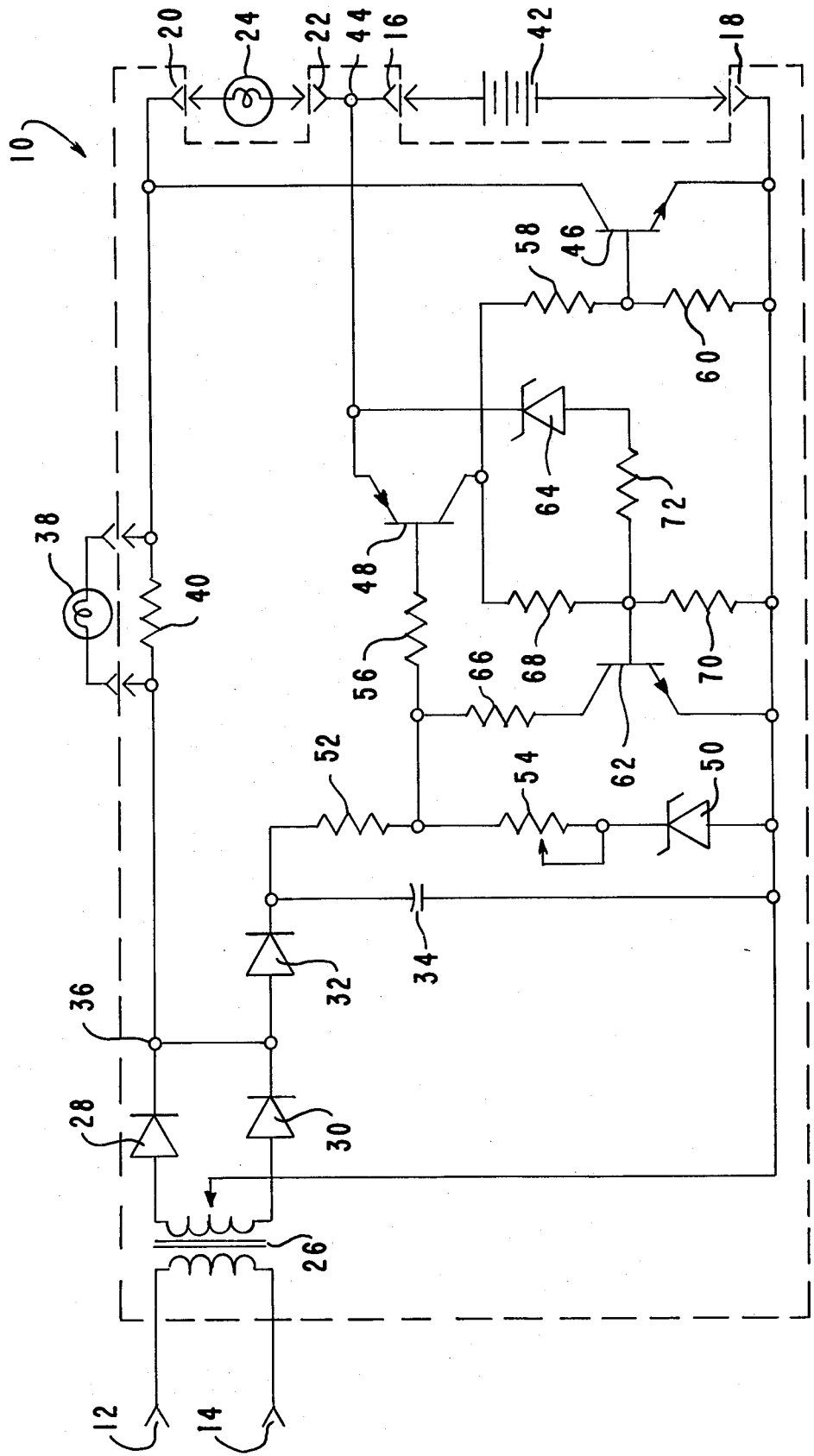

BATTERY CHARGING CIRCUIT FOR AN EMERGENCY SYSTEM

BACKGROUND OF THE INVENTION

The present invention relates to a battery charging circuit designed to satisfy the requirements of small emergency systems.

Rechargeable power sources, such as lead acid batteries, are commonly used for supplying electrical power to an emergency system during periods of main power failure. One such emergency system may, for example, be an emergency lighting system which provides illumination for hospitals, restaurants, department stores, and other public buildings when lighting from the main power system is interrupted.

Conventional battery charging units for coupling rechargeable power sources to emergency systems have a switching circuit to sense the loss of main power and couple the rechargeable source to the energy system. Some such units may have a separate and independent overcharge circuit for providing some form of regulation to prevent overcharging of the power source during the presence of main power. Other units may even have some form of additional drop-out circuit to prevent excessive discharge of the power source during loss of main power and use of the emergency system. These conventional battery charging units, however, suffer from the need to employ a multitude of different circuits to effect switching, overcharge regulation and low voltage drop-out with the additional components of each circuit adding to the cost and inefficiency of the overall unit.

It is therefore an object of the present invention to eliminate the draw-backs of conventional units, namely, the necessity to employ a multitude of different circuits to effect switching, overcharge regulation and provide low voltage drop-out.

Another object of the present invention is to provide a battery charging circuit for an emergency system which employs a minimum of electrical components and still provides effective switching, overcharging regulation, and low voltage drop-out protection.

Additional objects and advantages of the invention will be set forth in part in the description which follows, and, in part, will be obvious from the description or may be learned by practice of the invention. The objects and advantages of the invention may be realized and obtained by means of the instrumentalities and combinations particularly pointed out in the appended claims.

SUMMARY OF THE INVENTION

To achieve the foregoing objects, and in accordance with the purposes of the invention as embodied and broadly described herein, the present invention is a battery charging circuit for an emergency system comprising AC terminals for receiving an AC charging signal, DC terminals for receiving a rechargeable power supply, charging means coupled to the AC terminals for providing a DC charging signal to the DC terminals capable of charging the power supply, load terminals for receiving an emergency system, a multifunction single active element, and control circuit means for enabling the single active element to regulate the voltage across the DC terminals during the presence of the AC charging signal at the AC terminals and for enabling the single active element to complete a current path between the DC terminals and the load terminals upon loss of the AC charging signal at the AC terminals thereby allowing the rechargeable power supply to provide power for the emergency system. In the preferred embodiment of the present invention the control circuit means further includes drop-out means for enabling the single active element to interrupt the current path between the DC terminals and the load terminals upon reduction of a DC voltage at the DC terminals below a predetermined drop-out value.

In the preferred embodiment of the present invention the single active element comprises a semiconductor transistor having an emitter-collector path shunted across the DC terminals and the load terminals and having a base coupled to the control circuit means, the control circuit means rendering the transistor conductive during the presence of the AC charging signal at the AC terminals sufficient to hold the voltage across the DC terminals at a predetermined full-charge value, the circuit control means rendering the transistor saturated upon loss of the AC charging signal at the AC terminals sufficient to complete a current path between the DC terminals and the load terminals.

BRIEF DESCRIPTION OF THE DRAWING

The accompanying drawing, which is incorporated and constitutes a part of this specification, illustrates a schematic diagram of a preferred embodiment of the invention and, together with the description, serves to explain the principles of the invention.

DESCRIPTION OF THE PREFERRED EMBODIMENT

Reference will now be made in detail to the present preferred embodiment of the invention, an example of which is illustrated in the accompanying drawing.

The preferred embodiment of the battery charging circuit is shown in the drawings and is represented generally by the numeral 10. In accordance with the present invention, applicant's battery charging circuit for an emergency system comprises AC terminals for receiving an AC charging signal, DC terminals for receiving a rechargeable power supply, and load terminals for receiving an emergency system. In accordance with the present invention, applicant's battery charging circuit further comprises charging means coupled to said AC terminals for providing a DC charging signal to said DC terminals capable of charging said power supply.

As illustratively shown in the drawing, battery charging circuit 10 comprises first and second AC terminals 12 and 14, first and second DC terminals 16 and 18, and first and second load terminals 20 and 22. AC terminals 12 and 14 are capable of receiving an AC charging signal, DC terminals 16 and 18 are capable of receiving a rechargeable power supply such as jelled electrolyte sealed lead acid batteries, wet lead acid batteries, wet Nicad batteries and other forms of starved electrolyte sealed lead acid batteries or equivalents. Load terminals 20 and 22 are adapted to receive an emergency system. Preferably, the emergency system is an emergency lighting system comprising a source of illumination suitable for use during loss of normal illumination supplied by a main AC power system. As shown in the drawing, the emergency system may, for example, comprise a lamp 24 of the tungsten or halogen variety which exhibits a low resistance at low current draw and a high resistance at higher current draw.

The charging means of the present invention is illustratively shown in the drawing as comprising transformer 26, diodes 28, 30 and 32, and capacitor 34. The primary windings of transformer 26 are coupled to first and second AC terminals 12 and 14 while the secondary windings of transformer 26 are coupled respectively to the anodes of diodes 28 and 30 while the cathodes of diodes 28 and 30 are coupled together at node 36. A center tap of transformer 26 is shown in the drawing as being tied to second DC terminal 18 while the series combination of diode 32 and capacitor 34 is positioned between node 36 and second DC terminal 18.

In accordance with a preferred embodiment of the present invention, the charging means includes indicator means for indicating the state of said rechargeable power supply. As illustrated in the drawing, the indicator means may comprise a pilot lamp 38 or some other form of meter or semiconductor light emitting device parallel coupled to a resistor 40 and positioned between node 36 and first load terminal 20. Transformer 26, diodes 28, 30, 32, and capacitor 34 provide a DC charging circuit to DC terminals 16 and 18 capable of charging power supply 42.

In accordance with the present invention, said load terminals and said DC terminals being series coupled at a node A to position said emergency system in series with said power supply. As here embodied second load terminal 22 and first DC terminal 16 are coupled together at node 44 to position lamp 24 in series with rechargeable battery 42.

In accordance with the present invention, the battery charging circuit for an emergency system further comprises a multi-function single active element and control circuit means for enabling said single active element to regulate the voltage across said DC terminals during the presence of said AC charging signal at said AC terminals and for enabling said single active element to complete a current path between said DC terminals and said load terminals upon loss of said AC charging signal at said AC terminals thereby allowing said rechargeable power supply to provide power for said emergency system. Said multi-function single active element preferably comprises a semiconductor transistor having an emitter-collector path shunted across said DC terminals and said load terminals and having a base coupled to said control circuit means.

Further, in accordance with the present invention, said control circuit means comprises a control transistor having an emitter-collector path coupled to said node A to detect the voltage across said DC terminals and to control conduction of said multi-function transistor, the base current of said control transistor being limited during the presence of said AC charging signal at said AC terminals to render said multi-function transistor conductive sufficient to hold the voltage across the DC terminals at a predetermined full-charge value, and said base current of said control transistor being differently biased upon loss of said AC charging signal at said AC terminals to render said multi-function transistor saturated sufficient to complete a current path between said DC terminal and said load terminal not connected to node A.

As here embodied, transistor 46 has a collector coupled to first load terminal 20 and an emitter coupled to second DC terminal 18. A control circuit comprising transistor 48, zener diode 50, and resistors 52, 54, 56, 58, and 60 is coupled to the base of transistor 46 to enable transistor 46 to regulate the voltage across DC terminals 16 and 18 during the presence of an AC charging signal at AC terminals 12 and 14 and for enabling transistor 46 to complete a current path between DC terminals 16 and 18 and load terminals 20 and 22 upon loss of the AC charging circuit at AC terminals 12 and 14.

More specifically, the emitter of transistor 48 is coupled to node 44 while the collector of transistor 48 is coupled to second DC terminal 18 through the series combination of resistors 58 and 60. The junction of resistors 58 and 60 is coupled to the base of transistor 46. The series combination of resistors 52, resistor 54, and zener diode 50 is positioned in parallel with capacitor 34 while resistor 56 is coupled between the junction of resistors 52 and 54 and the base of transistor 48.

In accordance with the present invention, said control circuit means further includes drop-out means for enabling said single active element to interrupt said current path between said DC terminals and said load terminals upon reduction of a DC voltage at said DC terminals below a predetermined drop-out value. As here embodied, a preferred drop-out circuit is shown to comprise transistor 62, zener diode 64 and resistors 66, 68, 70 and 72. Zener diode 64 is coupled in series with resistor 72 and back biased between node 44 and the base of transistor 62. Resistor 68 is coupled between the collector of transistor 48 and the base of transistor 62 while resistor 70 is coupled between the base of transistor 62 and second DC terminal 18. The collector of transistor 62 is coupled by resistor 66 to the junction of resistors 52, 54 and 56 while the emitter of transistor 62 is coupled to second DC terminal 18.

In operation of the present invention, lamp 24 is coupled to first and second AC terminals 12 and 14 and rechargeable power supply 42 is coupled to first and second DC terminals 16 and 18. Upon application of an AC charging signal to AC terminals 12 and 14, a DC charging signal is provided by transformer 26 and diodes 28 and 30 through the parallel combination of lamp 38 and resistor 40 and through lamp 24 to DC terminals 16 and 18. The DC charging signal is preferably of sufficient magnitude to charge power supply 42 to a suitable voltage level. Furthermore, the current supply to DC terminals 16 and 18 may be selected to be limited by the resistance and/or reactance of transformer 26 and resistor 40 sufficient to prevent ignition of lamp 24 during charging of power supply 42. As explained above, lamp 24 is preferably of the tungsten or halogen variety which at low current draw exhibits a low resistance and gives off no light but at higher current draw experiences an increase in resistance typically in the magnitude of ten-fold and proceeds to generate illumination.

Assuming first that rechargeable power source 42 has a low stored voltage level, the DC charging signal provided to first and second DC terminals 16 and 18 will operate to recharge power source 42. When the voltage level of power source 42 is low, the current through resistor 40 providing the DC charging signal will be at a sufficiently high level to enable pilot light 38 to glow indicating that the voltage stored in power supply 42 is low and that a DC charging signal is being delivered to power supply 42. However, the resistance and/or reactance of transformer 26 and resistor 40 may be chosen to limit the magnitude of this current to prevent or limit turn-on of lamp 24 during the charging of power source 42. As the stored voltage rises in power source 42, the current through resistor 40 decreases, and as a consequence, pilot light 38 dims. Accordingly, pilot light 38 operates to provide an accurate indication of the state of power supply 42 and the presence of a DC charging signal being delivered to power source 42.

Furthermore should lamp 24 fail and thereby cause an open circuit between load terminals 20 and 22, no current can flow through resistor 40 and pilot light 38. Accordingly, when an AC charging signal is present at AC terminals 12 and 14, the absence of glow at pilot light 38 indicates a defective lamp 24, thus adding to the assured reliability of the battery charging circuit of the present invention.

The battery charging circuit of the present invention operates to hold the voltage across DC terminals 16 and 18 at a predetermined full-charge value and thus prevent overcharge of power supply 42. More specifically, the voltage across rechargeable power supply 42 is sensed at node 44 by transistor 48. The base current of transistor 48 is limited during the presence of an AC charging signal at AC terminals 12 and 14 by the presence of reversed biased zener diode 50. During the presence of an AC charging signal at AC terminals 12 and 14 zener diode 50 is reverse biased and effectively clamps the base of transistor 48 at a voltage selected to render transistor 48 conductive only when the voltage at node 44 rises above the predetermined full-charge value. Preferably, resistor 54 is provided with a variable adjustment in order to enable precise selection of the base bias voltage supplied to transistor 48 during the presence of an AC charging signal.

When the voltage at node 44 exceeds the predetermined full-charge value for rechargeable power supply 42, transistor 48 turns on, thereby providing a bias to the base of transistor 46 sufficient to turn transistor 46 on. When on, the emitter-collector of transistor 46 establishes a shunt path across rechargeable power supply 42, thereby preventing additional charging of power supply 42. Transistor 48 continues to render transistor 46 conductive as long as both the AC charging signal at AC terminals 12 and 14 is present to back bias zener diode 50 and the voltage at node 44 exceeds the predetermined full-charge value of rechargeable power supply 42.

Upon loss or interruption of the AC charging signal at AC terminals 12 and 14, the reverse bias across zener diode 50 is lost. The base current of transistor 48 is now governed primarily by the current flow through the emitter-collector path of transistor 62 since diode 32 prevents current flow through resistor 40 and zener diode 50 prevents current flow through resistor 54. The base biasing and consequently the conduction of the emitter-collector path of transistor 62 is, in turn, governed by the voltage across reverse bias zener diode 64. Thus, if the voltage at node 44 is above a predetermined drop-out value, zener diode 64 is reverse biased, transistor 62 is turned on and transistor 48 is driven into heavy conduction and/or saturation.

The heavy conduction or saturation of transistor 48 renders transistor 46 also heavily conductive or saturated. The heavy conduction or saturation of transistor 46, in turn, causes the emitter-collector path of transistor 46 to effectively couple first load terminal 20 to second DC terminal 18 and complete a current path between DC terminals 16 and 18 and load terminals 20 and 22. Transistor 46 thereby acts as a switch which places rechargeable power supply 42 across lamp 24, allowing power supply 42 to supply a sufficiently high current through lamp 24 to ignite lamp 24 and thereby provide emergency illumination. Thus, as a consequence of applicant's battery charging circuit, the dual functions of effective emergency switching and effective voltage regulation of power supply overcharging are combined in the single transistor 46. This serves to reduce the component count of the entire battery charging circuit and thus reduce the cost of the circuit.

The present battery charging circuit further enables transistor 46 to prevent destructive over-discharge of power source 42. When the voltage at node 44 drops below the predetermined drop-out value and as a consequence, reverse bias zener diode 64 is no longer conductive, transistor 62 looses base current and turns off, which in turn, shuts off transistor 48. With transistor 48 off transistor 46 is turned off to break the current path between rechargeable power supply 42 and lamp 24. The predetermined drop-out value is selected to prevent the voltage across DC terminals 16 and 18 from diminishing to a point where rechargeable supply 42 is over-discharged and consequently subject to reverse voltage and permanent damage. Zener diode 64 is therefore selected to have a break-down voltage which is no longer exceeded when the voltage at node 44 falls below the predetermined drop-out value.

Transistor 48 is kept off after the voltage at node 44 drops below the predetermined drop-out value even in the event of temporary resurgence of the voltage in power supply 42 by the clamping effect of resistor 68 which clamps transistor 62 off once transistor 48 is shut off.

By way of example, the following chart gives values for the circuit components of the drawing for one embodiment of the invention:

| Component | Value |
| --- | --- |
| 28 | 1N4002 |
| 30 | 1N4002 |
| 32 | 1N4002 |
| 34 | 100 uF, 25 V |
| 40 | 6.8 ohm, 1 W |
| 42 | 6 V |
| 46 | D44H5 |
| 48 | 2N4354 |
| 50 | 1N753 A |
| 52 | 1.8 K |
| 54 | 1 K, 0.2 W |
| 56 | 2.7 K |
| 58 | 180 ohm |
| 60 | 1 K |
| 62 | 2N3568 |
| 64 | 1N4732 A |
| 66 | 11 K |
| 68 | 33 K |
| 70 | 2.2 K |
| 72 | 100 K |

While a particular embodiment of the present invention has been shown and described, it will, of course, be obvious to one skilled in the art that certain advantages and modifications may be effected without departing from the spirit of the invention, and accordingly, it is intended that the scope of the invention not be determined by the foregoing example but only by the scope of the appended claims.

What is claimed is:

1. A battery charging circuit for an emergency system comprising:
    (a) AC terminals for receiving an AC charging signal;
    (b) DC terminals for receiving a rechargeable power supply;

(c) charging means coupled to said AC terminals for providing a DC charging signal to said DC terminals capable of charging said power supply;
(d) load terminals for receiving an emergency system;
(e) a multi-function single active element coupled across said DC terminals and said load terminals and having the capacity to shunt current from said DC terminals and said load terminals; and
(f) control circuit means for enabling said single active element to regulate the voltage across said DC terminals during the presence of said AC charging signal at said AC terminals and to shunt current from said DC terminals and said load terminals when said rechargeable power supply maintains a full-charge value, and for enabling said single active element to complete a current path between said DC terminals and said load terminals upon loss of said AC charging signal at said AC terminals thereby allowing said rechargeable power supply to provide power for said emergency system.

2. The battery charging circuit of claim 1 wherein said control circuit means further includes drop-out means for enabling said single active element to interrupt said current path between said DC terminals and said load terminals upon reduction of a DC voltage at said DC terminals below a predetermined drop-out value.

3. The battery charging circuit of claim 1 wherein said single active element comprises a semiconductor transistor having an emitter-collector path shunted across said DC terminals and said load terminals to shunt current from said DC terminals and said load terminals when said rechargeable power supply maintains a full-charge value, and having a base coupled to said control circuit means, said control circuit means rendering said transistor conductive during the presence of said AC charging signal at said AC terminals sufficient to hold the voltage across said DC terminals at a predetermined full-charge value, and said control circuit means rendering said transistor saturated upon loss of said AC charging signal at said AC terminals sufficient to complete a current path between said DC terminals and said load terminals.

4. The battery charging circuit of claim 3 wherein said control circuit means includes means for varying said full-charge value.

5. A battery charging circuit for an emergency system comprising:
(a) a pair of AC terminals for receiving an AC charging signal;
(b) a pair of DC terminals for receiving a power supply;
(c) charging means coupled to said AC terminals for providing a DC charging signal to said DC terminals capable of charging said battery;
(d) a pair of load terminals for receiving an emergency system, one of said load terminals and one of said DC terminals being couples together at a node A, the other of said load terminals being coupled to one of said AC terminals and the other of said DC terminals being coupled to the other of said AC terminals, to position said emergency system in series with said power supply;
(e) a multi-function transistor having an emitter-collector path shunted across said series coupled load terminals and DC terminals; and
(f) control circuit means coupled to the base of said multi-function transistor for enabling said multi-function transistor to regulate the voltage across said DC terminals during the presence of said AC charging signal at said AC terminals, and to shunt current from said DC terminals and said load terminals when said rechargeable power supply maintains a full-charge value, and for enabling said multi-function transistor to complete a current path between said DC terminals and said load terminals upon loss of said AC charging signal at said AC terminals, said control circuit further comprising drop-out means for preventing said multi-function transistor from completing said current path between said DC terminals and said load terminals upon reduction of a DC voltage at said DC terminals below a predetermined drop-out value.

6. The battery charging circuit of claim 5 wherein said charging means includes indicator means for indicating the state of said rechargeable power supply.

7. The battery charging circuit of claim 5 wherein said control circuit means comprises a control transistor, said control transistor having an emitter-collector path coupled to said node A to detect the voltage across said DC terminals and to control conduction of said multi-function transistor, the base current of said control transistor being limited during the presence of said AC charging signal at said AC terminals to render said multi-function transistor conductive sufficient to hold the voltage across said DC terminals at a predetermined full-charge value.

8. The battery charging circuit of claim 7 wherein the base current of said control transistor is primarily limited during the presence of said AC charging signal at said AC terminals by the voltage drop across the series combination of a first resistor and a first back-biased zener diode coupled between the base of said control transistor and said DC terminal not coupled to node A.

9. A battery charging circuit for an emergency system comprising:
(a) a pair of AC terminals for receiving an AC charging signal;
(b) a pair of DC terminals for receiving a rechargeable power supply;
(c) charging means coupled to said AC terminals for providing a DC charging signal to said DC terminals capable of charging said power supply, said charging means including isolation means for preventing discharge of said power supply through said charging means upon loss of said AC charging signal at said AC terminals;
(d) a pair of load terminals for receiving an emergency system, one of said load terminals and one of said DC terminals being coupled at a node A to position said emergency system in series with said power supply;
(e) a multi-function transistor having an emitter-collector path shunted across said series coupled load terminals and DC terminals; and
(f) control circuit means coupled to the base of said multi-function transistor for enabling said multi-function transistor to regulate the voltage across said DC terminals during the presence of said AC charging signal at said AC terminals and to shunt current from said DC terminals and said load terminals when said rechargeable power supply maintains a full-charge value; and for enabling said multi-function transistor to complete a current path between said DC terminals and said load terminals upon loss of said AC charging signal at said AC terminals, said control circuit means comprising a control transistor having an emitter-collector path coupled to said node A to detect the voltage across said DC terminals and to control conduction of said multi-function transistor, the base current of said control transistor being limited during the presence of said AC charging signal at said AC terminals to render said multi-function transistor conductive sufficient to hold the voltage across said DC terminals at a predetermined full-charge value, and said base current of said control transistor being differently biased upon loss of said AC charging signal at said AC terminals to render said multi-function transistor saturated sufficient to complete a current path between said DC terminal and said load terminal not connected to node A.

10. The battery charging circuit of claim 9 where said control circuit means includes drop-out means for preventing said multi-function transistor from completing said current path between said DC terminal and said load terminal upon reduction of a DC voltage at said DC terminals below a predetermined drop-out value.

* * * * *